(12) United States Patent
Eizner et al.

(10) Patent No.: US 11,796,783 B2
(45) Date of Patent: Oct. 24, 2023

(54) OPTICAL INSPECTION USING CONTROLLED ILLUMINATION AND COLLECTION POLARIZATION

(71) Applicant: Applied Materials Israel Ltd., Rehovot (IL)

(72) Inventors: Elad Eizner, Ness Ziona (IL); Amir Shoham, Nes-Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 78 days.

(21) Appl. No.: 17/506,040

(22) Filed: Oct. 20, 2021

(65) Prior Publication Data

US 2023/0117345 A1   Apr. 20, 2023

(51) Int. Cl.
*G02B 21/06* (2006.01)
*G02B 5/30* (2006.01)
*G01N 21/47* (2006.01)
*G01N 21/95* (2006.01)

(52) U.S. Cl.
CPC ............. *G02B 21/06* (2013.01); *G01N 21/47* (2013.01); *G01N 21/9501* (2013.01); *G02B 5/3025* (2013.01); *G01N 2201/063* (2013.01)

(58) Field of Classification Search
CPC ...... G02B 21/06; G02B 5/3025; G01N 21/47; G01N 21/9501; G01N 2201/063
See application file for complete search history.

(56) References Cited

U.S. PATENT DOCUMENTS

| 8,228,601 | B2 | 7/2012 | Meshulach et al. |
| 2009/0284835 | A1* | 11/2009 | Meshulach ........ G02B 21/0068 359/486.01 |
| 2018/0260191 | A1* | 9/2018 | Scarlett .................... G06F 7/588 |
| 2018/0284031 | A1 | 10/2018 | Shoham et al. |
| 2018/0364177 | A1* | 12/2018 | Liu .................... G01N 21/8806 |

* cited by examiner

*Primary Examiner* — Tarifur R Chowdhury
*Assistant Examiner* — Carlos Perez-Guzman
(74) *Attorney, Agent, or Firm* — KILPATRICK TOWNSEND & STOCKTON LLP

(57) ABSTRACT

An optical inspection system that may include an illumination optics configured to generate an illumination light beam and to illuminate a sample with the illumination light beam; at least one collection optics configured to collect light from the sample; at least one detector configured to detect at least one detected light beam outputted from the at least one collection optics; multiple polarizers that are configured to (a) set a polarization of the illumination light beam by selectively introducing, under a control of the control unit, at least one illumination optics polarization change, and (b) set a polarization of the at least one detected light beam by selectively introducing, under a control of the control unit, at least one collection optics polarization change. The multiple polarizers may include one or more illumination half-wave plates, one or more quarter-wave plates, and one or more inhomogeneous polarizers.

15 Claims, 9 Drawing Sheets

177

178

OPTICAL INSPECTION USING CONTROLLED ILLUMINATION AND COLLECTION POLARIZATION

BACKGROUND

Samples such as semiconductor wafers are getting more complex and denser. In addition, microscopic structural elements of new shapes and materials emerge.

Inspecting such samples is getting harder and there is a growing need to provide inspection system that can provide as much information about the inspected samples.

SUMMARY

There may be provided an optical inspection using controlled illumination and collection polarization.

There may be provided an optical inspection system that may include an illumination optics that is configured to generate an illumination light beam and to illuminate a sample with the illumination light beam; at least one collection optics configured to collect light from a sample as a result of an impingement of the illumination light beam on the sample; at least one detector configured to detect at least one detected light beam outputted from the at least one collection optics; multiple polarizers that are configured to (a) set a polarization of the illumination light beam by selectively introducing, under a control of a control unit, at least one illumination optics polarization change, and (b) set a polarization of the at least one detected light beam by selectively introducing, under a control of the control unit, at least one collection optics polarization change; and wherein the multiple polarizers may include an illumination half-wave plate, a first quarter-wave plate, a second half-wave plate, a second quarter-wave plate, and a first inhomogeneous polarizer.

There may be provided a method for inspecting a sample, the method may include determining polarizations of multiple polarizers of an optical inspection system; wherein the multiple polarizers may include a first half-wave plate, a first quarter-wave plate, a second half-wave plate, a second quarter-wave plate, and a first inhomogeneous polarizer; generating, by illumination optics, an illumination light beam; setting a polarization of the illumination light beam by selectively introducing at least one illumination optics polarization change, and illuminating the sample with the illumination light beam; collecting, by at least one collection optics, light from the sample, wherein the light resulted from the illuminating of the sample; setting a polarization of at least one detected light beam that is outputted from the at least one collection optics, by selectively introducing at least one collection optics polarization change; and detecting, by at least one detector, the at least one detected light beam.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION

Figure 1:
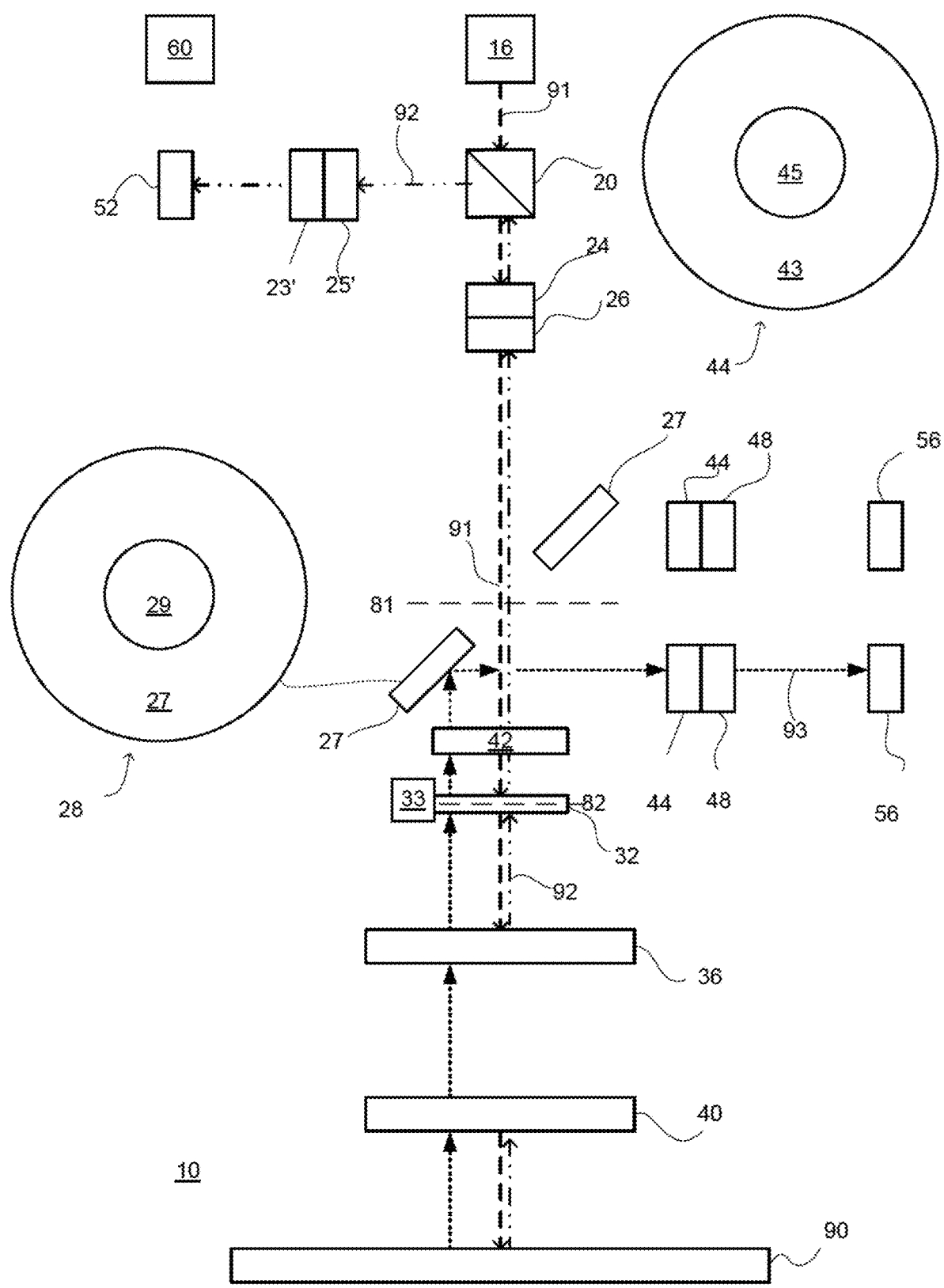
FIG. 1 is an example of an optical inspection system.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

There may be provided an optical inspection using controlled illumination and collection polarization.

There may be provided an optical inspection system that may include (i) illumination optics that is configured to generate an illumination light beam and to illuminate a sample with the illumination light beam; (ii) at least one collection optics configured to collect light from a sample as a result of an impingement of the illumination light beam on the sample; (iii) at least one detector configured to detect at least one detected light beam outputted from the at least one collection optics; (iv) and multiple polarizers that are configured to (a) set a polarization of the illumination light beam by selectively introducing, under a control of the control unit, at least one illumination optics polarization change, and (b) set a polarization of at least one detected light beam by selectively introducing, under a control of the control unit, at least one collection optics polarization change. The multiple polarizers may include one of more half-wave plates, one or more quarter-wave plates and one or more inhomogeneous polarizers, that may be common or separate elements for the collection and illumination optical paths.

The optical inspection system may generate an illumination light beam and at least one detected light beam in multiple polarizations—by controlling the mentioned above multiple polarizers. For example—the system may exhibit control over polarization states in transverse-electric polarization (S-polarization) and transverse-magnetic polarization (P-polarization), and every combination of P-polarization and S-polarization—including radial polarization, tangential polarization, spiral polarization, and optical vortex polarization.

The polarization control may be applied by the illumination optics, and at least one collection optics, for reflection imaging modes, for scattering imaging modes, and up to entire filling of the numerical aperture (NA).

The polarization control can be used during a method that may adaptively adjust polarization parameters.

The optical inspection system can increase the signal to noise ratio (SNR) by enhancing the optical signal of defects and, additionally or alternatively, reducing wafer radiation noise.

Figure 2:
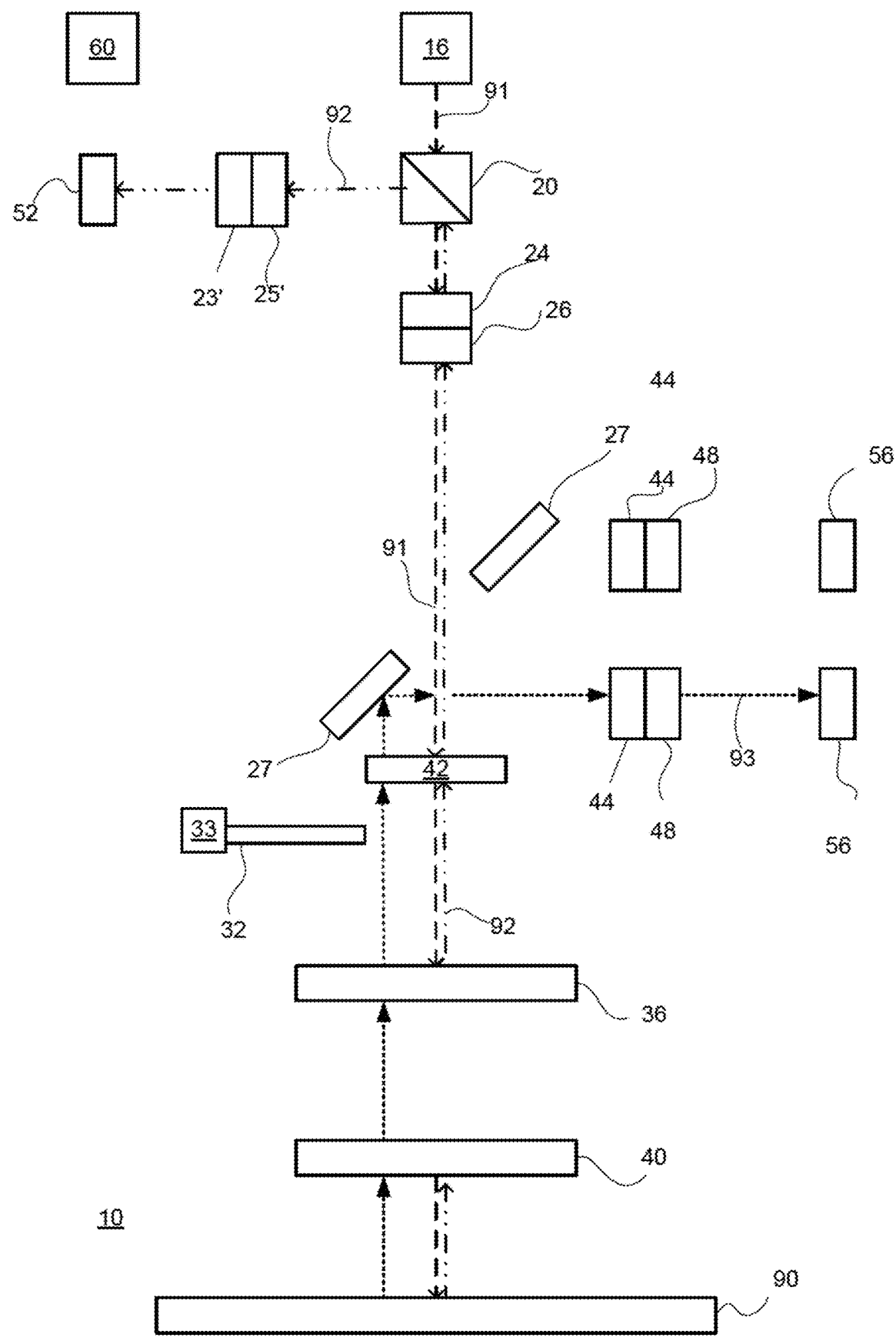
FIG. 2 is an example of an optical inspection system.
Figure 3:
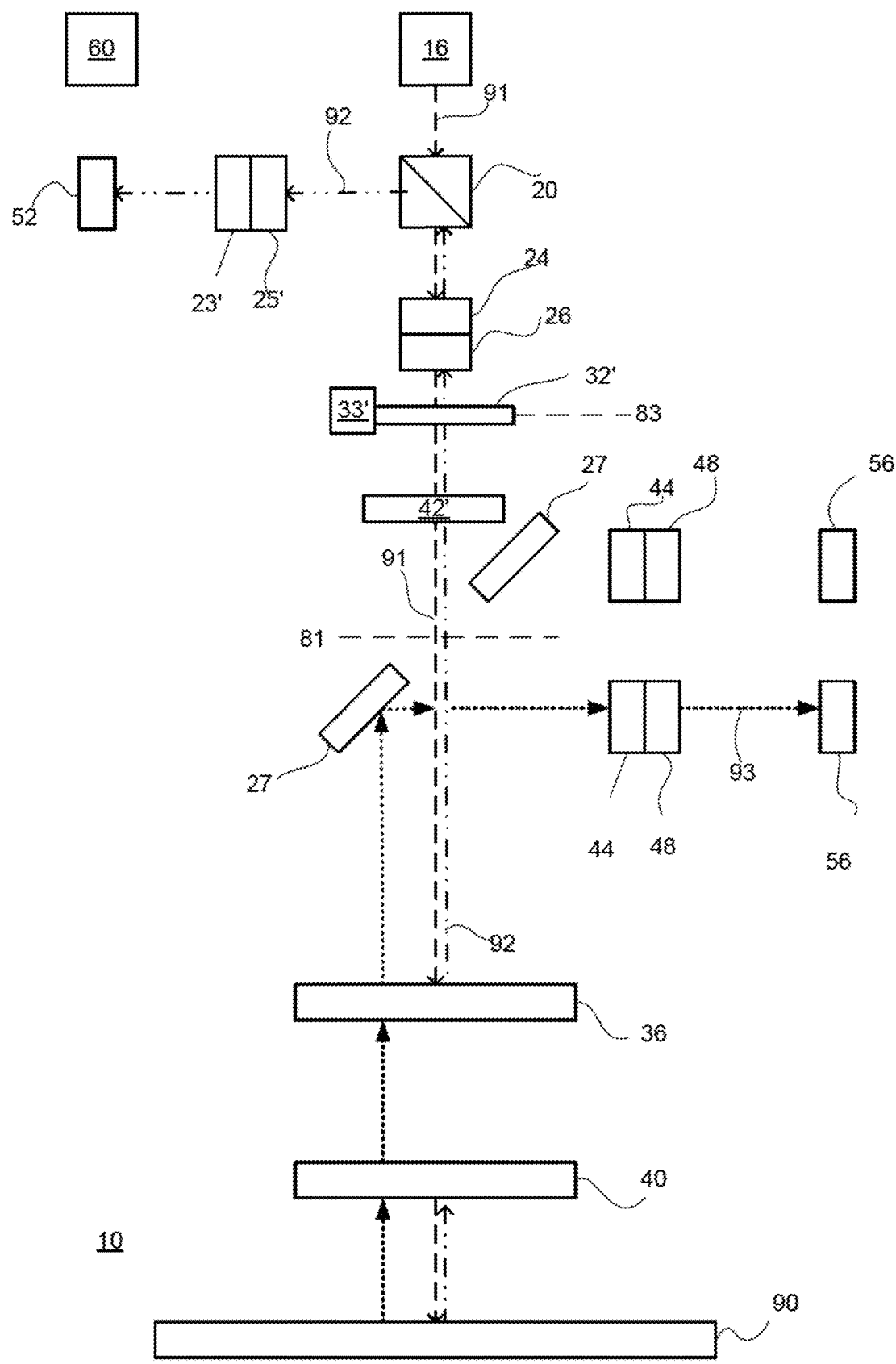
FIG. 3 is an example of an optical inspection system.

FIG. 1-3 illustrate exemplary optical inspection systems according to some embodiments.

Optical inspection system includes controller and/or processor 60, and has illumination optics and collection optics that share one or more optical elements such as telescope 36 and objective lens 40.

In FIG. 1 the illumination optics and the collection optics also share inhomogeneous polarizer (such as S-waveplate) 32 located at a second pupil plane 82, and a relay lens 42 positioned between a first pupil plane 81 and a second pupil plane 82. The first pupil plane 81 virtually crosses the center of the second beam splitter 28. The second beam splitter 28 may include, for example, a backside mirror of exterior part 27 (or another optically reflective element). Telescope 36 magnification together with the objective lens 40 defines the NA areas of aperture 29 and backside mirror of exterior part 27 in the aperture plane.

In FIG. 1 the illumination optics includes light source 16, first beam splitter 20, first half-wave plate 24, first quarter-wave plate 26, second beam splitter 28, relay lens 42, S-waveplate 32, telescope 36 and objective lens 40.

The S-waveplate 32 is movable by first movement unit 33.

The first movement unit 33 is configured to move the S-waveplate 32 between a first position in which the S-waveplate 32 is positioned within the path of the illumination light beam and a second position in which the S-waveplate 32 is located outside the path of the illumination light beam.

In FIG. 1 the illumination beam 91 is outputted by light source 16, passes through first beam splitter 20, may have its polarization set by at least one of first half-wave plate 24 and first quarter-wave plate 26, passes through central aperture 29 of the second beam splitter 28, has its polarization changed by S-waveplate 32, and be directed towards sample 90 and be focused onto sample 90 by telescope 36 and objective lens 40.

In FIG. 1, at least one collection optics includes objective lens 40, telescope 36, S-waveplate 32, relay lens 42, second beam splitter 28, first half-wave plate 24, first quarter-wave plate 26, and first beam splitter 20, third half-wave plate 25', and third quarter-wave plate 23'.

In FIG. 1, reflected beam 92 passes through objective lens 40, telescope 36, has its polarization changed by the S-waveplate 32, passes through relay lens 42, central aperture 29 of the second beam splitter 28, may have its polarization set by at least one of first half-wave plate 24 and first quarter-wave plate 26, and is directed, by first beam splitter 20, may have its polarization changed by third half-wave plate 25' and third quarter-wave plate 23', and may reach first detector 52 or any first detection optics that ends by the first detector 52.

In FIG. 1, scattered beam 93 passes through objective lens 40, telescope 36, has its polarization changed by the S-waveplate 32, passes through relay lens 42, impinges on a backside mirror of exterior part 27 of the second beam splitter 28 and is directed towards second half-wave plate 44 and second quarter-wave plate 48, may have its polarization set by at least one of second half-wave plate 44 and second quarter-wave plate 48, and is directed to second detector 56 or any second detection optics that ends by the second detector 56. Second half-wave plate 44 includes second aperture 45 and second exterior part 43.

It should be noted that reflected beam 92 and scattered beam 93 are named based on assumption that the illumination of the sample is as illustrated in FIG. 1. Other illumination schemes may result in having a reflected beam pass through the path of what is referred to as reflected beam 92 of FIG. 1 and have a scattered beam pass through the path of what is referred to as scattered beam 93. It should be noted that the optical inspection system may have other illumination paths—for example illumination paths that illuminate the sample at angles that differ from ninety degrees.

In FIG. 1, for simplicity of explanation, beam 92 was illustrated as propagating to the side of beam 91—but both beams (at least between the object and the first beam splitter) may be coaxial.

FIG. 2 illustrates an example of optical inspection system in which the S-waveplate is located outside the path of the illumination beam and outside the path of the reflected beam.

FIG. 3 illustrates another inhomogeneous polarizer (such as other S-waveplate 32') that is located at a third pupil plane 83 that differs from the second pupil plane—for example is located upstream to the first pupil plane 81. The other S-waveplate 32' can be moved by second movement unit 33'.

The second movement unit 33' is configured to move the other S-waveplate 32' between a third position in which the other S-waveplate 32' is positioned within the path of the illumination light beam and a fourth position in which the other S-waveplate 32' is located outside the path of the illumination light beam.

Any movement of any inhomogeneous polarizer may be of any type—linear, rotational, and the like.

FIG. 3 also illustrates another relay lens 42' positioned between the other S-waveplate 32' and the first pupil plane 81.

Figure 4:
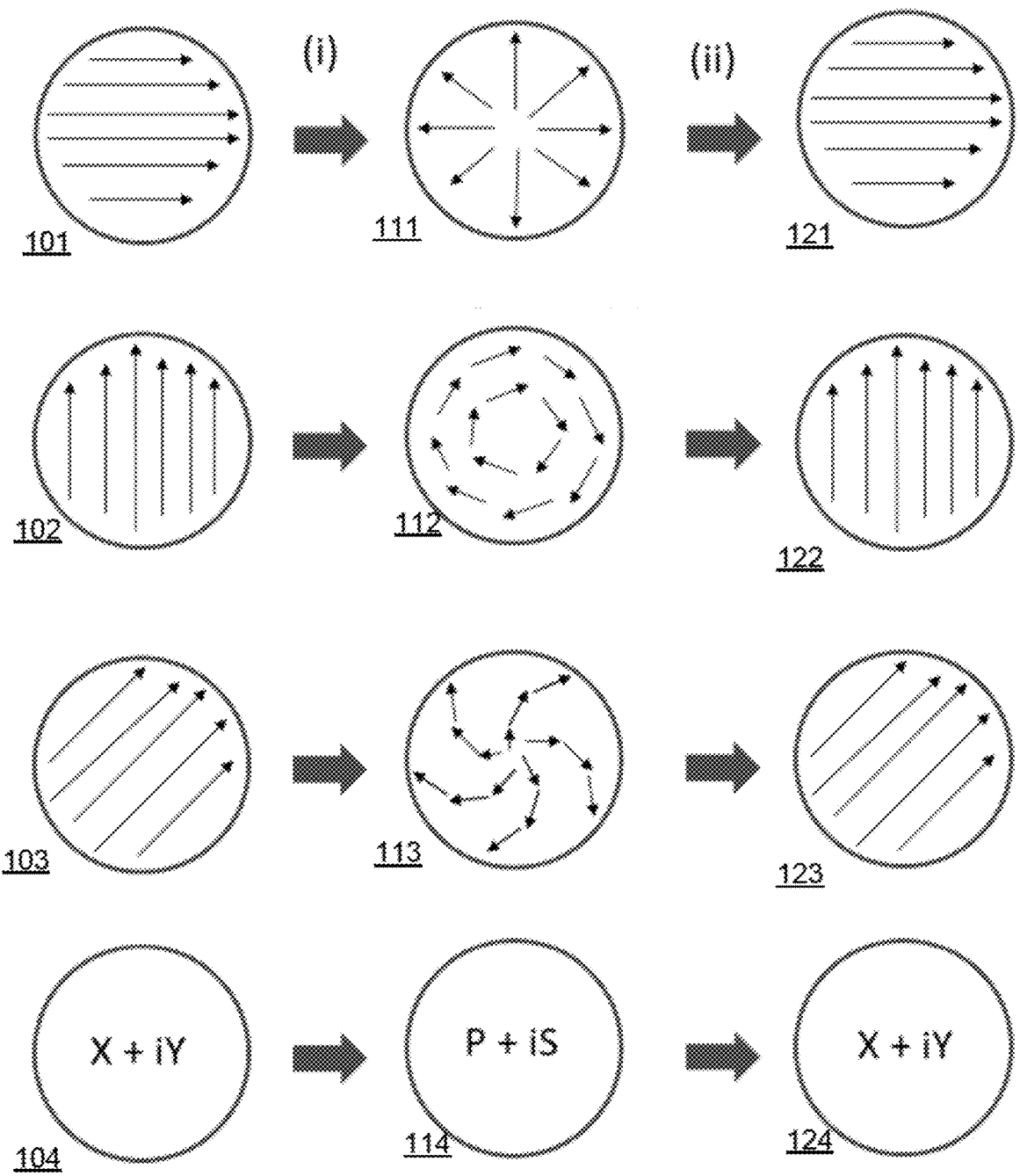
FIG. 4 illustrates examples of polarization modes.

FIG. 4 illustrates examples of light polarization after single or double pass through an S-waveplate.

A single pass of linear (x-axis) polarization 101 through the S-waveplate provides a radial (P) polarization 111, while a double pass provide the original (linear x-axis) polarization 121.

A single pass of linear (y-axis) polarization 102 through the S-waveplate provides a tangential (S) polarization 112, while a double pass provide the original (linear Y-axis) polarization 122.

A single pass of linear (diagonal) polarization 103 through the S-waveplate provides a spiral polarization 113, while a double pass provide the original (linear diagonal) polarization 123.

A single pass of circular (X+iY) polarization 104 through the S-waveplate provides an optical vortex polarization 114, while a double pass provide the original (circular) polarization 124.

Figure 5:
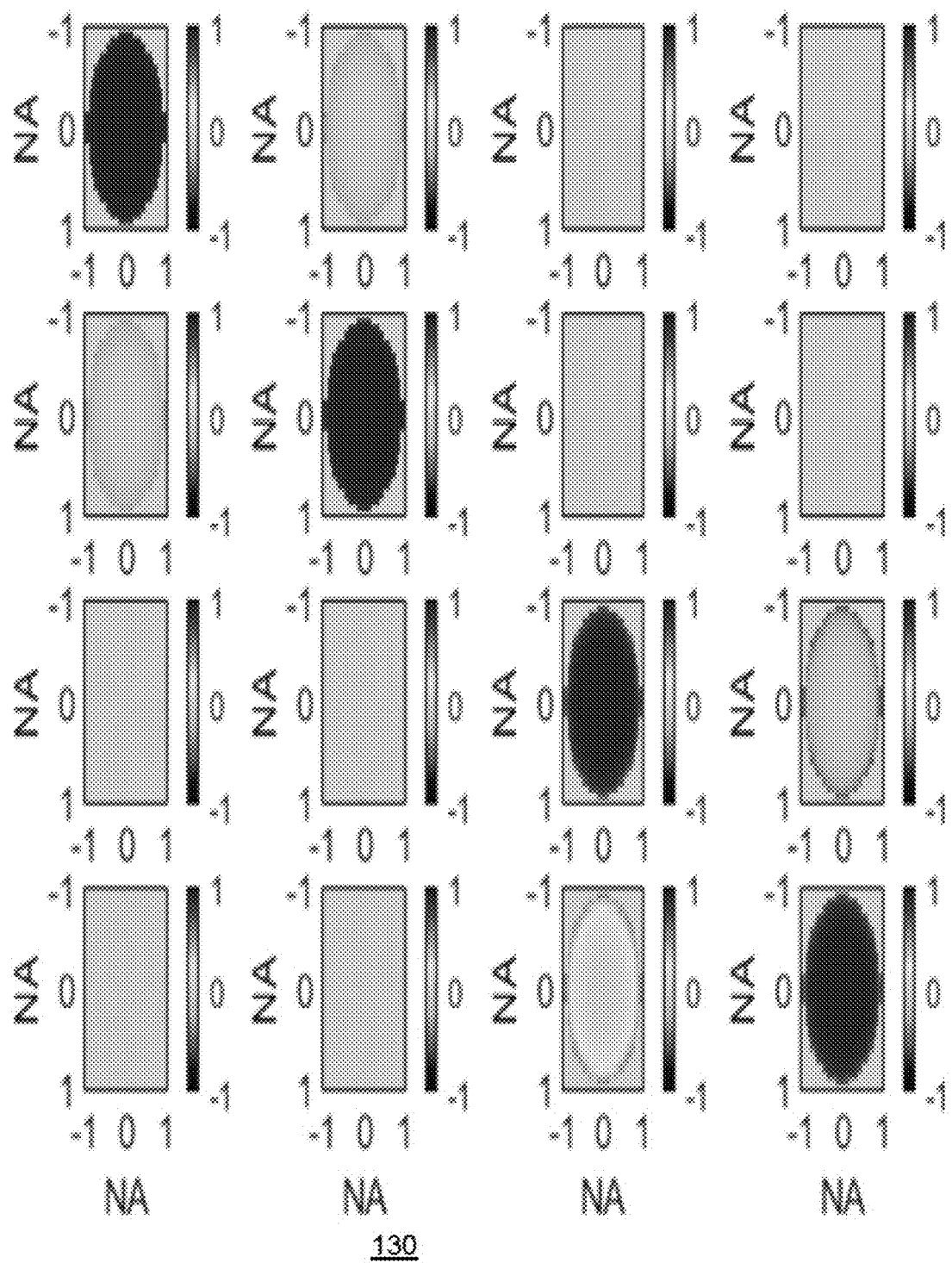
FIGS. 5 and 6 illustrate examples of Mueller matrix polarimetry.

FIG. 5 illustrates an example of Mueller matrix polarimetry of Silicon substrate reflection in S-P base—as can be seen in the sixteen different images collectively denoted 130. FIG. 5 illustrates that the S-P is the natural polarization base for flat wafer geometry.

Figure 6:
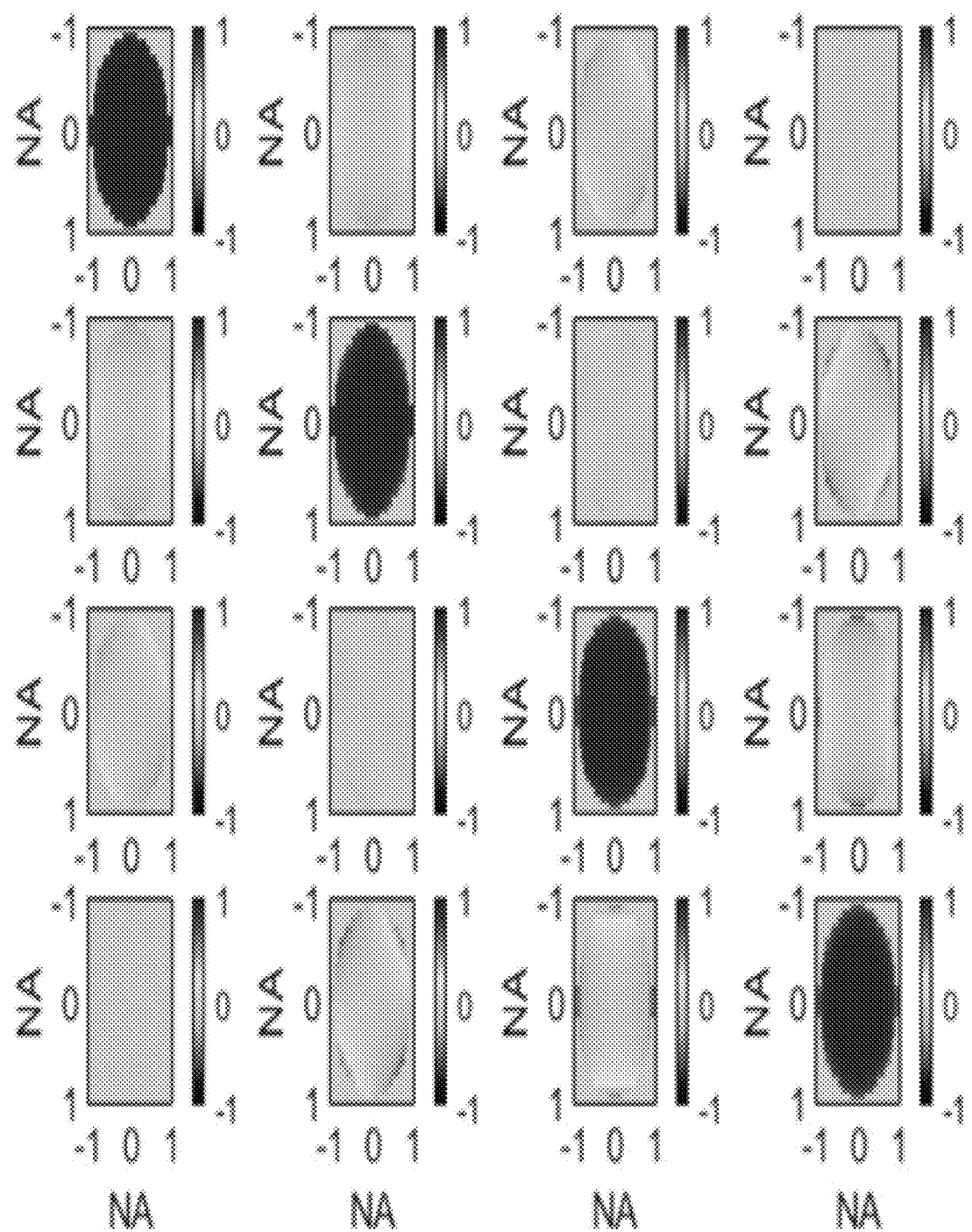

FIG. 6 illustrates an example of Mueller matrix polarimetry of Silicon substrate reflection in linear polarization base—as can be seen in the sixteen different images collectively denoted 132.

Figure 7:
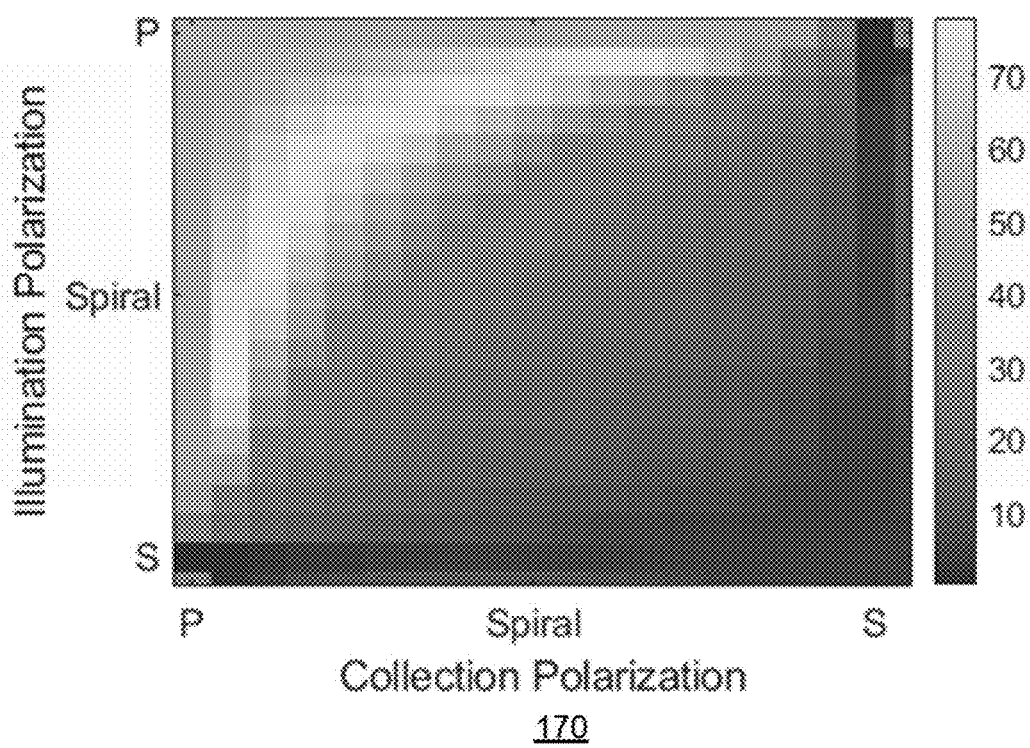
FIGS. 7 and 8 illustrate examples of various detected signal attributes.

FIG. 7 illustrates an example of an SNR map 170 in S-P base, for Si particle on a rough Si surface using reflection collection channel. This is an example where max SNR is found at a polarization configuration not on the S-P main axes.

This figure demonstrates the need for a system that can span the entire S-P base to find the max SNR.

Figure 8:
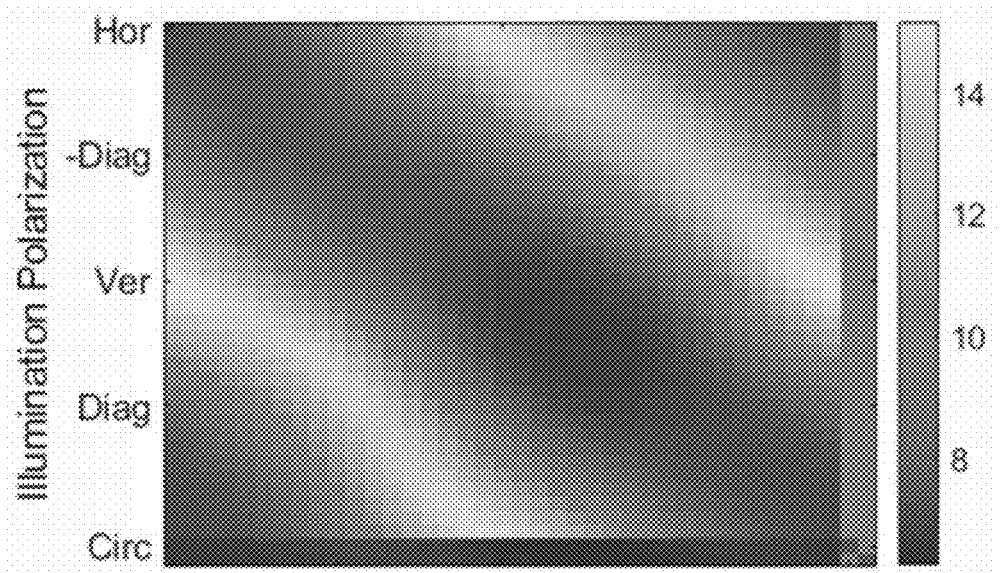
Figure 8:
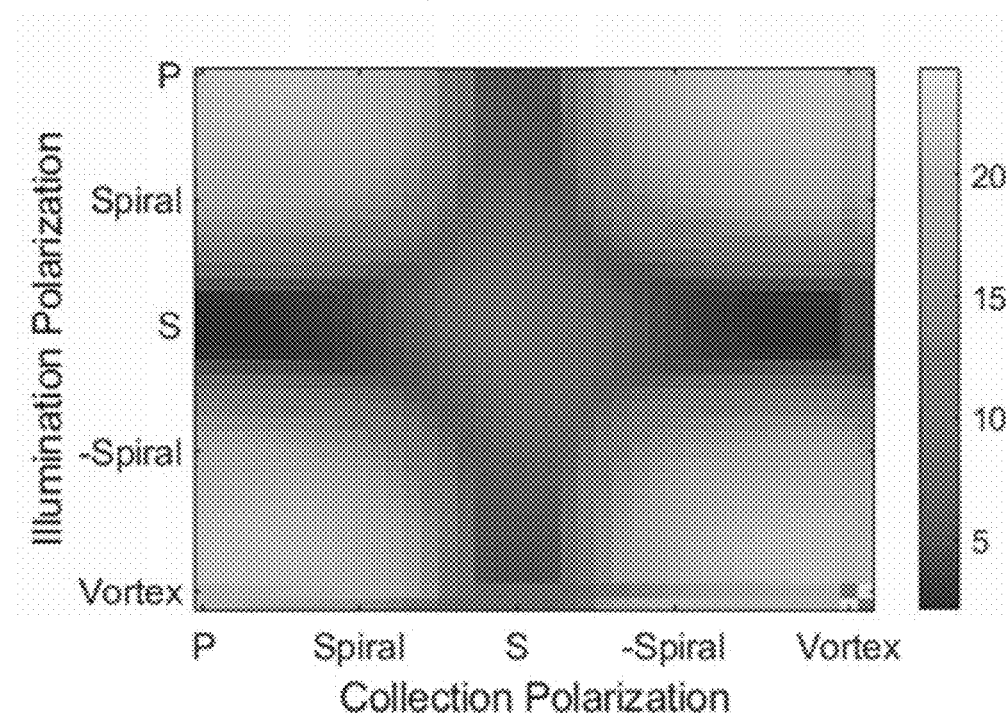

In FIG. 8 illustrates SNR maps 177 and 178 for Si particle on a rough Si surface using scattering collection channel.

Each point on the map is the calculated SNR for a given illumination polarization and collection polarization.

Top: linear polarization base. Bottom: S-P polarization base. The SNR maps are based on full electro-magnetic finite-difference time domain (FDTD) simulations in S-matrix approach.

Compared to a linear polarization-based microscope, in S-P polarization base, the max SNR is much higher and is found at a stable, non-orthogonal illumination and collection polarizations.

An optical inspection system may include more than a single inhomogeneous polarizer. For example—one shared by the illumination optics and a collection optics (see for example S-waveplate 32) and another may be allocated to a scattering collection channel (for example—having the S-waveplate located in another pupil plane between beam splitter 28 and second half-wave plate 44.

Figure 9:
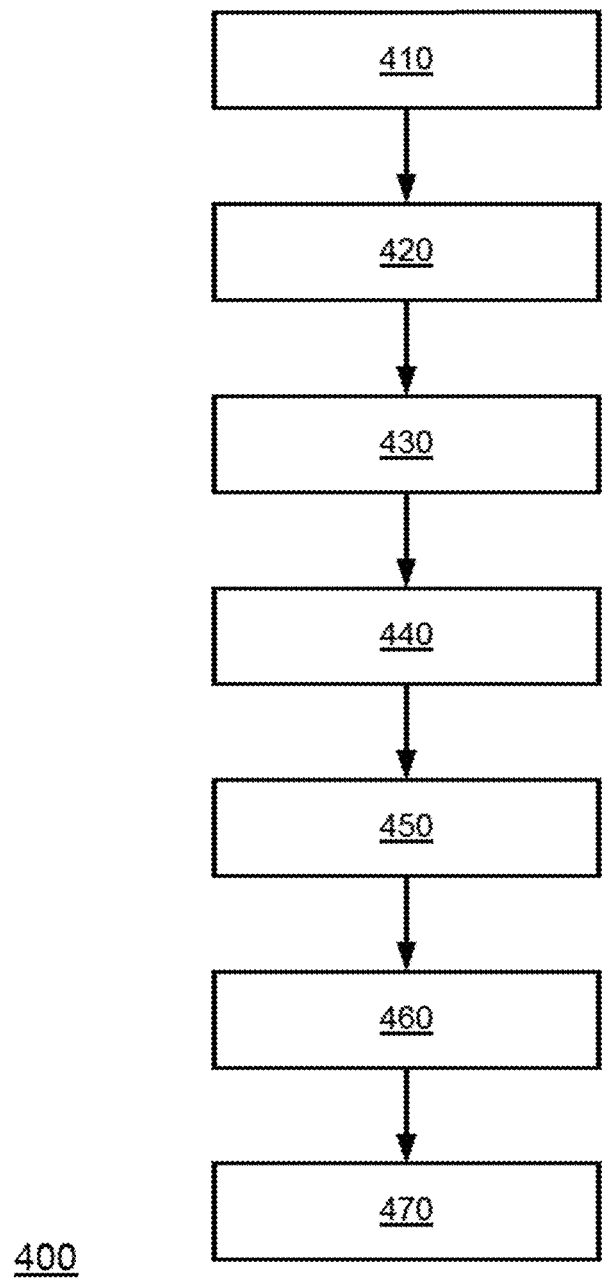
FIG. 9 is an example of a method.

FIG. 9 is an example of method 400.

Method 400 is for illuminating a sample and detecting light from the sample.

Method 400 may start by step 410 of determining polarizations of multiple polarizers of an optical inspection system; wherein the multiple polarizers comprise a first half-wave plate, a first quarter-wave plate, a second half-wave plate, a second quarter-wave plate, and a first inhomogeneous polarizer.

Step 410 may be followed by step 420 of generating, by illumination optics, an illumination light beam.

Step 420 may be followed by step 430 of setting a polarization of the illumination light beam by selectively introducing at least one illumination optics polarization change, and illuminating a sample with the illumination light beam.

Step 430 may be followed by step 440 of collecting, by at least one collection optics, light from the sample, wherein the light resulted from the illuminating of the sample.

Step 440 may be followed by step 450 of setting a polarization of at least one detected light beam that is outputted from the at least one collection optics, by selectively introducing at least one collection optics polarization change.

Step 450 may be followed by step 460 of detecting, by at least one detector, the at least one detected light beam.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. An optical inspection system, comprising:
    an illumination optics that is configured to generate an illumination light beam and to illuminate a sample with the illumination light beam;
    at least one collection optics configured to collect light from the sample as a result of an impingement of the illumination light beam on the sample;
    at least one detector configured to detect at least one detected light beam outputted from the at least one collection optics;
    multiple polarizers that are configured to (a) set a polarization of the illumination light beam by selectively introducing, under a control of a control unit, at least one illumination optics polarization change, and (b) set a polarization of the at least one detected light beam by selectively introducing, under a control of the control unit, at least one collection optics polarization change, wherein the multiple polarizers comprise an illumination half-wave plate, a first quarter-wave plate, a second half-wave plate, a second quarter-wave plate, a first inhomogeneous polarizer, and a second inhomogeneous polarizer; and
    a first movement unit and a second movement unit, wherein the first movement unit is configured to move the first inhomogeneous polarizer between a first position in which the first inhomogeneous polarizer is positioned within a path of the illumination light beam and a second position in which the first inhomogeneous polarizer is located outside the path of the illumination light beam, and wherein the second movement unit is configured to move the second inhomogeneous polarizer between a third position in which the second inhomogeneous polarizer is positioned within the path of the illumination light beam and a fourth position in which the second inhomogeneous polarizer is located outside the path of the illumination light beam.

2. The optical inspection system according to claim 1, wherein the multiple polarizers are configured to provide any polarization of the illumination light beam and any polarization of at least one detected illumination light beam within a parallel polarization-orthogonal polarization plane.

3. The optical inspection system according to claim 1, wherein the multiple polarizers are configured to provide an illumination light beam of any polarization out of a radial polarization, a tangential polarization, a spiral polarization, and an optical vortex polarization.

4. The optical inspection system according to claim 1, wherein the multiple polarizers are configured to provide an illumination light beam of a spiral polarization.

5. The optical inspection system according to claim 1, wherein the illumination optics and the at least one collection optics share a shared beam splitter, wherein the first inhomogeneous polarizer is located downstream to the shared beam splitter.

6. The optical inspection system according to claim 1, wherein the illumination optics and the at least one collection optics share a shared beam splitter, wherein the first inhomogeneous polarizer is located upstream to the shared beam splitter.

7. The optical inspection system according to claim 1, wherein the at least one collection optics comprises a reflected light collection optics configured to output a reflected detected light beam, and a scattered light collection optics.

8. A method for inspecting a sample, the method comprising:
    generating, by illumination optics, an illumination light beam;
    moving, by a first movement unit, a first inhomogeneous polarizer between a first position in which the first inhomogeneous polarizer is positioned within a path of the illumination light beam and a second position in which the first inhomogeneous polarizer is located outside the path of the illumination light beam;
    setting, by at least one polarizer, a polarization of the illumination light beam by selectively introducing at least one illumination optics polarization change, and illuminating the sample with the illumination light beam, wherein the at least one polarizer comprises the first inhomogeneous polarizer;
    collecting, by at least one collection optics, light from the sample, wherein the light resulted from the illuminating of the sample;
    setting a polarization of at least one detected light beam that is outputted from the at least one collection optics, by selectively introducing at least one collection optics polarization change; and
    detecting, by at least one detector, the at least one detected light beam.

9. The method according to claim 8, wherein the polarization of the illumination light beam and the polarization of the at least one detected illumination light beam are selected out of any polarization within a parallel polarization—orthogonal polarization plane.

10. The method according to claim 8, wherein the polarization of the illumination light beam is selected out of a radial polarization, a tangential polarization, a spiral polarization, and an optical vortex polarization.

11. The method according to claim 8, wherein the polarization of the illumination light beam is a spiral polarization.

12. The method according to claim 8, wherein the illumination optics and the at least one collection optics share a shared beam splitter, wherein the first inhomogeneous polarizer is located downstream to the shared beam splitter.

13. The method according to claim 8, wherein the illumination optics and the at least one collection optics share a shared beam splitter, wherein the first inhomogeneous polarizer is located upstream to the shared beam splitter.

14. The method according to claim 8, wherein the at least one collection optics comprises a reflected light collection optics configured to output a reflected detected light beam, and a scattered light collection optics.

15. The method according to claim 8, comprising moving, by a second movement unit is configured, a second inhomogeneous polarizer between a third position in which the second inhomogeneous polarizer is positioned within the path of the illumination light beam and a fourth position in which the second inhomogeneous polarizer is located outside the path of the illumination light beam.

\* \* \* \* \*